(12) United States Patent
Kim et al.

(10) Patent No.: US 8,053,110 B2
(45) Date of Patent: Nov. 8, 2011

(54) SURFACE TREATED ANODE AND LITHIUM BATTERY USING THE SAME

(75) Inventors: Gue-sung Kim, Yongin-si (KR);
Dong-min Im, Yongin-si (KR);
Seok-gwang Doo, Yongin-si (KR);
Young-su Chung, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 897 days.

(21) Appl. No.: 12/054,628

(22) Filed: Mar. 25, 2008

(65) Prior Publication Data
US 2009/0053606 A1  Feb. 26, 2009

(30) Foreign Application Priority Data
Aug. 23, 2007  (KR) ................. 10-2007-0084995

(51) Int. Cl.
*H01B 1/24* (2006.01)
*H01M 4/38* (2006.01)
*H01M 10/00* (2006.01)

(52) U.S. Cl. .............. 429/209; 429/218.1; 429/233; 429/248; 252/511; 252/516

(58) Field of Classification Search ............. 429/209, 429/212, 217, 218.1, 232, 233, 248; 252/511–514; 427/58, 372.2
See application file for complete search history.

(56) References Cited

U.S. PATENT DOCUMENTS

| | | | |
|---|---|---|---|
| 7,316,865 B2 * | 1/2008 | Kweon et al. | 429/218.1 |
| 2007/0007239 A1 * | 1/2007 | Lee et al. | 216/13 |
| 2009/0148778 A1 * | 6/2009 | Kawase et al. | 429/330 |
| 2009/0155692 A1 * | 6/2009 | Park et al. | 429/231.1 |

* cited by examiner

*Primary Examiner* — Mark Kopec
(74) *Attorney, Agent, or Firm* — Lee & Morse, P.C.

(57) ABSTRACT

A surface treated anode and a lithium battery using the same are provided. The surface treated anode includes a current collector, and an anode active material layer formed on the current collector. The anode active material layer is treated with an amine group containing compound.

20 Claims, 3 Drawing Sheets

SURFACE TREATED ANODE AND LITHIUM BATTERY USING THE SAME

CROSS-REFERENCE TO RELATED APPLICATION

This application claims the benefit of Korean Application No. 2007-84995, filed Aug. 23, 2007, in the Korean Intellectual Property Office, the disclosure of which is incorporated herein by reference.

BACKGROUND OF THE INVENTION

1. Field of the Invention

Aspects of the present invention relate to a surface treated anode, and a lithium battery using the same.

2. Description of the Related Art

Various conventional techniques, proposing the use of lithium metals as anode active materials for lithium batteries, have been suggested. However, when lithium metals are used in lithium batteries, short circuits may occur, due to lithium dendrite formation, which can cause explosions. Thus, carbonaceous active materials have been widely used as anode materials, instead of lithium metals. Examples of such carbonaceous active materials include: crystalline carbon, such as, natural graphite and artificial graphite; and amorphous carbon, such as, soft carbon and hard carbon. However, although amorphous carbon has a high capacity, many of its charge/discharge reactions are irreversible. Since the theoretical capacity of crystalline carbon (including graphite) is relatively high, i.e., 372 mAh/g, crystalline carbon is widely used as an anode active material. Although the theoretical capacity of such graphite or carbon-based active materials (approximately 380 mAh/g) is relatively high, it is not high enough for future higher capacity lithium batteries.

To address these problems, research on metal-based and metalloid-based, anode active materials has been actively conducted. For example, research on lithium batteries using metals or metalloids, such as, aluminum, germanium, silicon, tin, zinc, lead, etc., as the anode active material, has been conducted. Such materials are known to have large capacities, high energy densities, and good insertion/extraction capabilities, as compared to carbon-based anode active materials. Thus, lithium batteries having large capacities and high energy densities can be prepared using these materials. For example, pure silicon is known to have a high theoretical capacity of 4017 mAh/g.

However, such materials have shorter life cycles than carbon-based materials, and thus, cannot be put to practical use. When inorganic particles, such as, silicon or tin are used as the anode active material, the volume of inorganic particles changes considerably during charge/discharge cycles. This may result in the degradation of an electronic conduction network between the active material particles, or may result in the detachment of an anode active material from an anode current collector. That is, the volume of an inorganic material, such as, silicon or tin, increases by about 300 to 400%, due to alloying with lithium during charging. The volume decreases during discharging, due to the extraction of lithium. Therefore, after repeated charge/discharge cycles, spaces may be generated between the active material particles, and electrical insulation may occur, thereby rapidly lowering the life cycle characteristics of these materials, and causing serious problems when using these materials in lithium batteries.

Recently, various attempts have been made to develop new active materials for secondary batteries, having increased theoretical capacities. One such attempt includes the use of high-capacity, composite, anode active materials, for example, silicon (Si)-carbon (C), or tin (Sn)-carbon (C). However, there may be several disadvantages in using such materials, such as, severe electrochemical irreversibility during charging and discharging. This may be caused by increases in the defects and the specific surface area of carbon, during a compounding process. In addition, the charge/discharge efficiency is lowered, due to weakened bonds between active material particles, which may be caused by the extreme expansion and contraction of the active materials.

SUMMARY OF THE INVENTION

Aspects of the present invention provide a surface treated anode having improved initial efficiency and cycle characteristics.

Aspects of the present invention provide a method of preparing a surface treated anode having improved initial efficiency and cycle characteristics.

Aspects of the present invention provide a lithium battery using the surface treated anode.

According to an aspect of the present invention, there is provided a surface treated anode including a current collector, and an anode active material layer formed on the current collector. The anode active material layer is treated with an amine group containing compound.

According to another aspect of the present invention, there is provided method of preparing a surface treated anode, including: preparing an anode active material mixture, by mixing an anode active material, a conducting agent, a binder, and a solvent; forming an anode active material layer, by applying the anode active material mixture to a current collector; performing a surface treatment, by applying a surface treatment mixture, which includes an amine group containing compound and a solvent, to the anode active material layer; and then drying the same in a vacuum.

Additional aspects and/or advantages of the invention will be set forth in part, in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
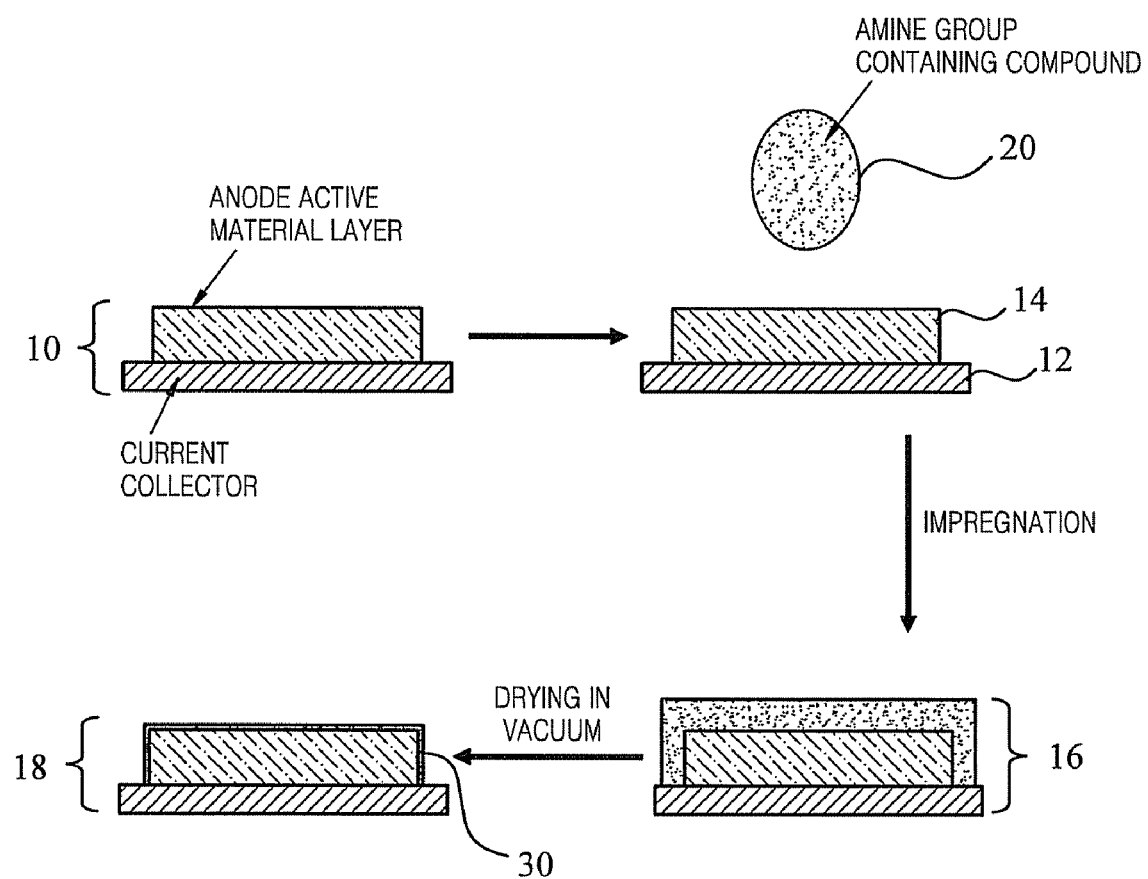
FIG. 1 is a schematic diagram illustrating a preparation method of a surface treated electrode, according to exemplary embodiments of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Aspects of the present invention provide a surface treated anode having improved initial efficiency and cycle characteristics, by suppressing irreversible reactions during charging and discharging, and improving a binding force between active material particles, and a lithium battery using the surface treated anode. The surface treated anode includes a surface coating formed on an anode active material. The base material can be a composite material having Si/C, or Sn/C, as a main component.

The surface treated anode includes a current collector and an anode active material layer. The surface of the anode active material layer can be treated with an amine group containing compound.

The current collector may be a copper current collector. The anode active material layer is formed by preparing an anode active material mixture, by mixing a conducting agent, a binder, and a solvent. The mixture is coated on the copper current collector, to form an active material layer. Alternately, the anode material mixture may be cast on a separate support to obtain an anode active film. The anode active film is released from the support, and then laminated to the copper current collector.

The amine group containing compound improves the initial efficiency and cycle characteristics of a battery including the amine group containing compound. The amine group containing compound suppresses side reactions with an electrolyte solution, and improves a binding force between anode active material particles.

The amine group containing compound can be, for example, a silane compound, a germanium compound, a tin compound, an aluminum compound, a gallium compound, an indium compound, a titanium compound, a hydrocarbon compound, and the like, or a combination thereof. For example, the amine group containing compound can be aminosilane, diaminosilane, aminotrialkoxysilane, diaminodialkoxysilane, aminoalkyltrialkoxysilane, diaminoalkyldialkoxysilane, and the like, or a combination thereof.

Among the substituted groups contained in the amine group containing compound, the alkyl group can include a straight-chain or branched $C_1$-$C_{20}$ radical, and a straight-chain or branched $C_1$-$C_{12}$ radical. In some exemplary embodiments the alkyl radical includes a lower alkyl having 1 to 6 carbon atoms. Examples of such radicals include methyl, ethyl, n-propyl, isopropyl, n-butyl, isobutyl, sec-butyl, t-butyl, pentyl, iso-amyl, hexyl, and the like. In some exemplary embodiments the alkyl radical includes a lower alkyl radical having 1 to 4 carbon atoms. The alkyl radical can be further substituted by at least one halo, such as, a fluoro, a chloro, or a bromo, to provide a haloalkyl radical.

Among the substituted groups contained in the amine group containing compound, the alkoxy group can include an oxygen-containing straight-chain or branched radical having a $C_1$-$C_{20}$ alkyl. In some exemplary embodiments the alkoxy group includes a lower alkoxy radical having 1 to 6 carbon atoms. Examples of such radicals include methoxy, ethoxy, propoxy, butoxy, t-butoxy, and the like. In some exemplary embodiments the alkoxy group includes a lower alkoxy radical having 1 to 3 carbon atoms. The alkoxy radical can be further substituted by at least one halo, such as a fluoro, a chloro, or a bromo, to provide a haloalkyl radical. In some exemplary embodiments the alkoxy group includes a lower haloalkoxy radical having 1 to 3 carbon atoms, for example, the lower haloalkoxy radical can include a fluoromethoxy, a chloromethoxy, a trifluoromethoxy, a trifluoroethoxy, a fluoroethoxy, a fluoropropoxy, and the like.

FIG. 1 shows method of forming a surface treated anode electrode 18, according to an exemplary embodiment of the present invention. As shown in FIG. 1, an anode electrode 10 comprises a current collector 12 and an anode active material layer 14 disposed on the current collector 12. A surface treatment mixture 20, including an amine group containing compound and a solvent, is added to the anode active material layer 14. The solvent can be removed from the resultant structure, by drying in a vacuum (i.e., a partial vacuum), thereby forming the surface treated electrode 18, which includes a surface coating 30 disposed on the anode active material layer 14. The surface coating 30 may exist in a continuous or discontinuous form. In addition, the surface coating 30 may be disposed on the anode active material layer 14, and/or may be incorporated into the anode active material layer 14.

The drying can be performed at a temperature of from about 50 to 200° C., for about 0.1 to 20 hours. If the conditions of the heat treatment (drying) are not met, the coating may not be properly formed.

The solvent include: chain carbonates, such as, dimethyl carbonate, ethyl methyl carbonate, diethyl carbonate, or dipropyl carbonate; cyclic carbonates, such as, ethylene carbonate, propylene carbonate, or butylene carbonate; γ-butyrolactone; N-methyl-pyrrolidone, acetone, water, and the like. The amine group containing compound may be included in the surface treatment mixture 20, in a concentration in a range of 0.1 to 50 wt %, based on the weight of the surface treatment mixture 20. The formation of the surface coating 30 can be adjusted, by adjusting the concentration of the amine group containing compound in the surface treatment mixture 20. The surface coating 30 can contain the amine group containing compound in an amount ranging from about 0.0001 to 2 wt %, for example, from about 0.001 to 1 wt %, with respect to the weight of the anode active material layer 14. It is possible to control the formation (content or thickness), of the surface coating 30, by controlling the amount of the amine group containing compound in the surface treatment mixture 20. The anode active material layer 14 can be formed by applying an anode active material mixture, comprising the anode active material, a conducting agent, a binder, and a solvent.

The amount of the amine group containing compound is determined, based on the weight of the anode active material layer 14, which contains the anode active material and the conducting agent. Although it is difficult to measure the actual applied amount of the amine group containing compound, a relative amount of the amine group containing compound can be calculated, based on measurable data. For example, an aminopropyltriethoxy silane mixture, which can be used as a surface treatment mixture, is added to an anode active material layer. The anode active material layer 14 being a combination of an anode active material powder and a graphite powder, mixed in a ratio of 5:1. The resultant mixture can be dried at 150° C., for 20 hours, resulting in the amine group containing compound making up 1.7 wt %, on average of the anode active material layer, after drying.

When the drying was performed at 120° C., for 2 hours, the average amount of the amine group containing mixture was 36.2 wt %, based on the weight of the anode active material layer 14. When the drying was performed at 80° C., for 2 hours, the average amount of the amine group containing mixture was 41.3 wt %. When the drying was performed between at 120~150° C., for 20 hours, the average amount of the solvent of the amine group mixture was 0 wt %, and the amount of aminopropyltriethoxy silane (Density: 0.949) was 0.5 wt %. 0.375 ml of a amine group containing mixture, having a density of about 1.069 g/ml, was coated and dried at 120° C., for 2 hours. The amount of the amine group compound, contained in the anode active material layer, can be calculated using Formulas 1 and 2:

Content of amine group compound=[Coated amount of amine group compound mixture]×[Density of amine group compound mixture]×[wt % of amine group compound in amine group compound mixture]×[wt % of amine group compound after drying] <Formula 1>

Wt % of amine group compound in anode active material layer=[Amount of amine]/[Weight of anode active material layer]×100 <Formula 2>

The anode active material layer 14 is obtained by mixing an anode active material, a conducting agent, a binder, and a solvent, to prepare an anode active material mixture, which is then directly coated on a copper current collector. Alternately, the anode material mixture may be cast on a separate support, to obtain an anode active film. The anode active film is released from the support, and then laminated on the copper current collector, to form the anode active material layer 14.

Examples of anode active materials include: a metal-based anode active material, a carbonaceous anode active material, and a composite anode active material thereof. The carbonaceous anode active material includes at least one selected from the group consisting: of carbon; graphite, such as, natural graphite and artificial graphite; and amorphous carbon, such as, soft carbon and hard carbon. The metal-based anode active material may include at least one metal selected from the group consisting of Si, Sn, Al, Ge, Pb, Zn, Ag and Au, and alloys thereof. The composite anode active material, containing the particles of the carbonaceous anode active material and the metal-based anode active material, can be prepared by mixing the carbonaceous anode active material and the metal-based anode active material. The composite anode active material can be subjected to mechanical mixing, e.g., ball milling. If necessary, annealing may further be performed. According to some exemplary embodiments, the anode active material is a Si/C composite, or a Sn/C composite.

To prepare the anode active material layer, carbon black, for example, is used as the conducting agent. Usable examples of the binder include a vinylidene fluoride/hexafluoropropylene (HFP) copolymer, polyvinylidene difluoride (PVdF), polyacrylonitrile, polymetacrylate, polytetrafluoroethylene, mixtures of these materials, and a styrene butadiene rubber polymer. As the solvent, N-methyl-pyrrolidone, acetone, water, and the like, can be used. Here, the cathode electrode active material, the conducting agent, the binder, and the solvent are included in amounts generally acceptable in the art, for the manufacture of the lithium battery.

Figure 3:
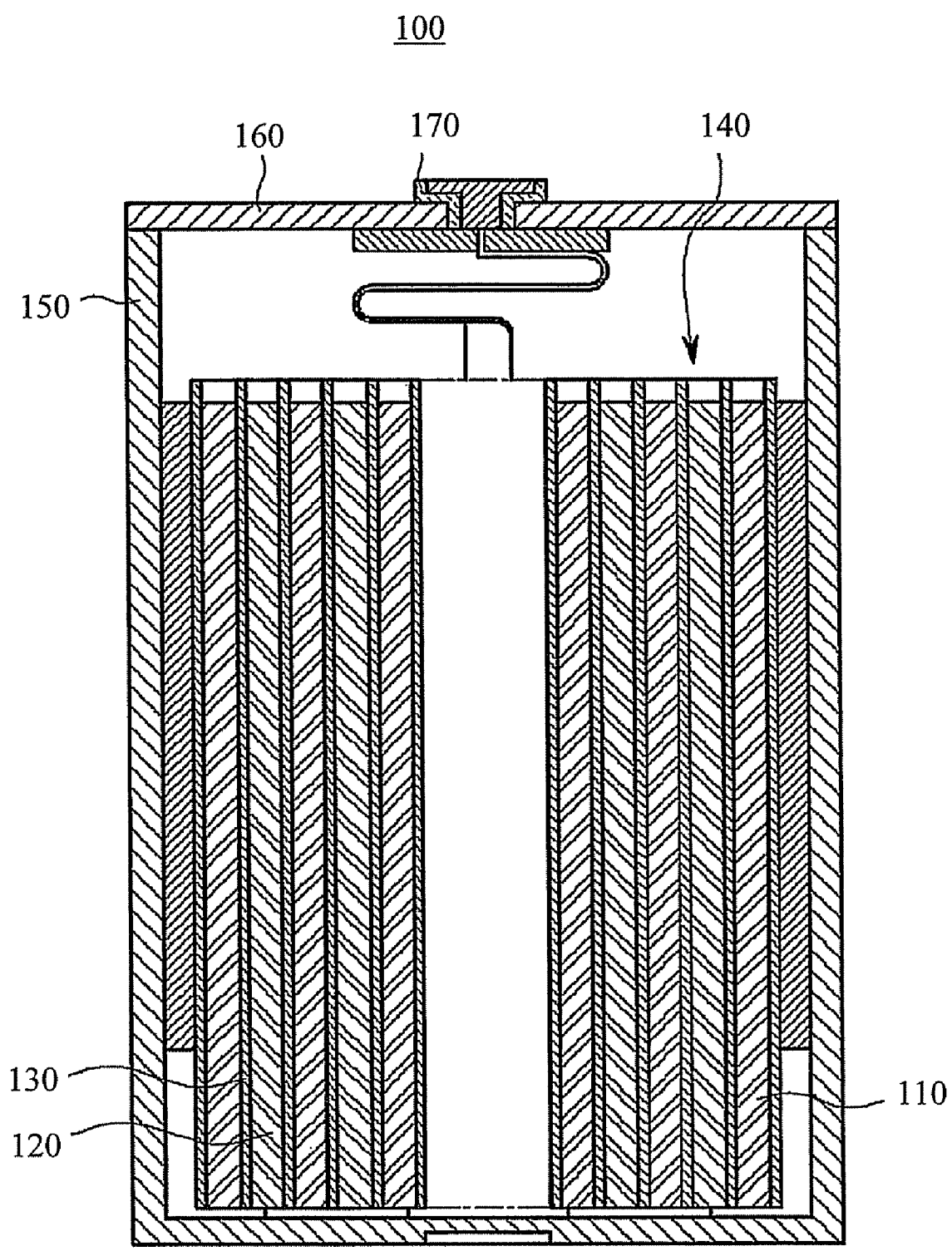
FIG. 3 illustrates a lithium battery, according to exemplary embodiments of the present invention.

The surface treated anode 18, prepared as described in FIG. 1, can be advantageously used for a lithium battery. FIG. 3 shows a lithium battery 100, according to an exemplary embodiment of the present invention. As shown in FIG. 3 the lithium battery 100 includes an electrode assembly 140, including an anode electrode 110, a cathode electrode 120, and a separator 130 disposed therebetween. The electrode assembly 140 is disposed inside a case 150, and then an electrolyte (organic electrolyte solution) is injected into the case 150. The case 150 is sealed using a cap plate 160 and a gasket 170.

The anode electrode 110, according to an exemplary embodiment of the present invention, is prepared as follows. First, an anode active material mixture is prepared, by mixing an anode active material, a conducting agent, a binder, and a solvent. An anode plate is prepared by directly coating the anode active material mixture onto a metal collector, and is then dried. The anode plate may be manufactured by casting the anode active material mixture on a separate support, by forming the film in a support, releasing the film from the support, and then laminating the film on a metal current collector. The anode plate is then subjected to a surface treatment, using a surface treatment mixture that includes an amine group containing compound, to obtain the surface treated anode.

To prepare the cathode electrode 120, a cathode active material, a conducting agent, a binder, and a solvent are mixed, to prepare a cathode active material mixture. The cathode active material mixture is directly coated on an aluminum current collector, and is then dried, to prepare the cathode electrode 120. In an alternative embodiment, the cathode active material mixture is cast on a separate support, and peeled off to obtain a cathode active material film. The cathode active material film is then laminated on the aluminium current collector.

A lithium-containing metal oxide may be used as the cathode electrode active material. Examples of the lithium-containing metal oxide include $LiCoO_2$, $LiMn_xO_{2x}$, $LiNi_{1-x}Mn_xO_{2x}$ (x=1, 2), and $Ni_{1-x-y}Co_xMn_yO_2$ ($0 \leq x \leq 0.5$, $0 \leq y \leq 0.5$). However the present invention is not limited thereto. In the cathode active material mixture, the same conducting agent, binder, and solvent may be used, as described for the anode active material mixture. The cathode electrode active material, the conducting agent, the binder, and the solvent, used in the manufacture of the lithium battery, are used in amounts generally acceptable in the art, without any particular limitations.

In some cases, a plasticizing agent may be further added into each of the cathode and anode active material mixtures, to form porous cathode and anode plates. The separator 130 can be any separator that is commonly used for lithium batteries. In particular, the separator 130 may have low resistance to the migration of ions in an electrolyte, and may have an excellent electrolyte-retaining ability. Specific examples of the separator 130 include glass fiber, polyester, polyethylene, polypropylene, polytetrafluoroethylene (PTFE), a combination thereof. The separator 130 can be a material that can be rolled, and may be in a non-woven or a woven fabric. In some exemplary embodiments, the separator 130 includes polyethylene, polypropylene, or the like, however, the present invention is not limited thereto. The separator 130 that can retain a large amount of the organic electrolytic solution.

A method of forming the separator 130 will now be described. A polymer resin, a filler, and a solvent are mixed to prepare a separator composition. The separator composition is directly coated on the electrodes 110 and 120, and then dried to form the separator 130. Alternately, the separator composition can be cast onto a separate support, dried, detached from the separate support, and finally laminated on an upper portion of the electrodes 110 and/or 130, thereby forming the separator 130.

Any polymer resin that is commonly used for lithium batteries can be used. Examples of the polymer resin include vinylidenefluoride/hexafluoropropylene copolymer, polyvinylidenefluoride, polyacrylonitrile, polymethylmethacrylate, and a mixture thereof, however the present invention is not limited thereto. Particularly, a vinylidenefluoride/hexafluoropropylene copolymer containing 8 to 25%, by weight, of hexafluoropropylene can be used as the polymer resin.

This electrode assembly 140 is wound or folded, and then sealed in the case 150. Alternatively, the electrode assembly 140 may be stacked to form a bi-cell structure, which is then impregnated with an organic electrolyte solution, and the resulting structure is sealed in a pouch, thereby completing a lithium ion polymer battery.

The organic electrolyte solution includes a lithium salt, and a mixed organic solvent. The mixed organic solvent comprises a high dielectric constant solvent and a low boiling point solvent. Any high dielectric constant solvent commonly used in the art may be used, according to aspects of the present invention. Specific examples of the high dielectric constant solvents include: cyclic carbonates, such as, ethylene carbonate, propylene carbonate, or butylene carbonate; and γ-butyrolactone. When necessary, a variety of additives, such as an overcharge preventing agent, may further be added.

The low boiling point solvent can be any such solvent commonly used in the art. For example, the low boiling point solvent can include: chain carbonates, such as, dimethyl carbonate, ethyl methyl carbonate, diethyl carbonate, or dipropyl carbonate; dimethoxyethane; diethoxyethane; fatty acid ester derivatives; and the like.

Hydrogen atoms, existing in the high dielectric constant solvent and the low boiling point solvent, may be substituted by halogen atom(s), and fluorine. The high dielectric constant solvent and the low boiling point solvent are generally mixed in a ratio of 1:1 to 1:9, by volume. If the volumetric ratio of the low boiling point solvent to the high dielectric constant solvent does not fall within the stated range, the lithium battery may demonstrate undesirable characteristics, in terms of discharge capacity, charge/discharge cycles, and lifespan.

In addition, the lithium salt is preferably at least one selected from the group consisting of $LiClO_4$, $LiCF_3SO_2$, $LiPF_6$, $LiN(CF_3SO_2)_2$, $LiBF_4$, $LiC(CF_3SO_2)_3$, and $LiN(C_2F_5SO_2)_2$, however, the present invention is not limited thereto. The concentration of the lithium salt is generally in the range of 0.5 to 2.0 M. If the concentration of the lithium salt is less than 0.5 M, the ionic conductivity of the electrolytic solution decreases, so that the performance of the electrolytic solution may be reduced. If the concentration of the lithium salt is greater than 2.0 M, the viscosity of the electrolytic solution increases, so that mobility of lithium ions can be undesirably reduced.

Aspects of the present inventive concept will be described in greater detail, with reference to the following examples. The following examples are for illustrative purposes only, and are not intended to limit the scope of the inventive concept.

Preparation of a Composite Anode Active Material 1 g of a silicon metal powder, having an average particle diameter of less than 100 nm (NANOSTRUCTURE AND AMORPHOUS MATERIALS, Inc., USA), and 2 g of graphite (MCMB2528, OSAKA GAS, Japan) were mixed in a mortar, for 1 hour. The powder was placed in a closed vessel made of hardened steel, together with 8 steel balls weighing 21 g. The vessel was filled with argon, and the powder was milled using an 8000M Mixer/Mill (SPEX CERTIPREP, USA), for 60 minutes, thereby preparing a Si/C composite anode active material.

Example 1

7.5 g of the composite anode active material powder, 1.5 g of graphite powder, and 20 g of 5 wt % of a PVDF solution (solvent: NMP) were mixed using a mechanical stirrer, to prepare a mixture (slurry). The slurry was coated on a copper (Cu) current collector using a doctor blade to a thickness of about 200 μm. The coated slurry was dried on the Cu current collector, at room temperature, and then dried again under a vacuum, at 130° C., thereby preparing an anode plate.

Aminopropyltriethoxy silane was added to dimethyl carbonate (DMC), and then stirred for 2 hours, to prepare a 0.5 wt % solution. 0.25 mL of the solution was applied to a 1 $cm^2$ surface area of the anode. A vacuum was applied, such that the solution was drawn into the anode, at room temperature, and the dimethyl carbonate solvent was removed. Thereafter, drying was performed in a vacuum oven at 120° C., for 2 hours, thereby finally preparing a surface treated anode.

Example 2

A surface treated anode was prepared following the same procedure as in Example 1, except that instead of aminopropyltriethoxy silane, aminopropyltrimethoxy silane was used, to form the surface treated anode.

Example 3

A surface treated anode was prepared following the same procedure as in Example 1, except that a 1 wt % aminopropyltriethoxy silane solution was produced, to form the surface treated anode.

Example 4

A surface treated anode was prepared following the same procedure as in Example 1, except that a 2 wt % aminopropyltriethoxy silane solution was produced, to form the surface treated anode.

Example 5

A surface treated anode was prepared following the same procedure as in Example 1, except that the drying temperature in the vacuum was 80° C., rather than 120° C.

Comparative Example 1

7.5 g of the composite anode active material powder, 1.5 g of graphite powder, and 20 g of 5 wt % of a PVDF solution (solvent: NMP) were mixed using a mechanical stirrer, to prepare a slurry. The slurry was coated on a Cu current collector using a doctor blade, to a thickness of about 200 μm. The coated slurry was dried at room temperature, and then dried again under a vacuum, at 130° C., thereby preparing an anode plate.

Comparative Example 2

A surface treated anode was prepared following the same procedure as in Example 1, except that instead of aminopropyltriethoxy silane, vinyltriethoxy silane was used.

Comparative Example 3

A surface treated anode was prepared following the same procedure as in Example 1, except that instead of aminopropyltriethoxy silane, vinyltri(2-methoxyethoxy) silane was used.

Comparative Example 4

A surface treated anode was prepared following the same procedure as in Example 1, except that instead of aminopropyltriethoxy silane, N-octadecyltrimethoxy silane was used.

Comparative Example 5

A surface treated anode was prepared following the same procedure as in Example 1, except that instead of aminopropyltriethoxy silane, glycycloxypropyltrimethoxy silane was used.

Comparative Example 6

A surface treated anode was prepared following the same procedure as in Example 1, except that instead of aminopropyltriethoxy silane, mercaptopropyltrimethoxy silane was used.

Comparative Example 7

A surface treated anode was prepared following the same procedure as in Example 1, except that instead of aminopropyltriethoxy silane, methacryloxymethyltriethoxysilane was used.

Fabrication of Lithium Battery 2016-standard coin cells were fabricated using the anode plates prepared in Examples 1 to 5 and Comparative Examples 1 to 7, each coin cell including lithium metal as a counter electrode, a PTFE separator, and an electrolyte solution of 1.3 M $LiPF_6$ dissolved in a mixed solvent of ethylene carbonate (EC), diethyl carbonate (DEC) and fluoroethylene carbonate (FEC), in a volume ratio of 2:6:2.

Comparative Example 8

A 2016-standard coin cell was fabricated using the anode plate prepared in Comparative Example 1, the coin cell including lithium metal as a counter electrode, a PTFE separator, and an electrolyte solution of 1.3 M $LiPF_6$ dissolved in a mixed solvent of ethylene carbonate (EC), diethyl carbonate (DEC) and fluoroethylene carbonate (FEC), in a volume ratio of 2:6:2, with 0.5 wt % of aminopropyltriethoxy silane added by stirring for 24 hours.

Experimental Example 1

In the anode prepared in Example 1, the weight of the anode active material layer is equal to a sum of the weights of an anode active material and a conducting agent, that is, 3 mg.

The aminopropyltriethoxy silane solution was added to an anode active material powder including a mixture of anode active material powder and graphite powder in a ratio of 5:1, and dried at 120° C., for 2 hours, giving about 36.2 wt %, on average, of the amine group containing compound. After the drying of dimethyl carbonate (DMC) (Density: 1.07), which is used as a solvent of the amine group compound solution, was performed at 120~150° C., for 20 hours, the average amount of the solvent of the amine group compound solution was 0 wt %. The amount of the aminopropyltriethoxy silane (density: 0.949) was 0.5 wt %. 0.375 ml of a solution having a density of about 1.069 g/ml was applied, and then dried at 120° C., for 2 hours, the amount of the amine group compound contained in the anode active material layer was calculated using Formulas 1 and 2:

Amount of amine group compound=[Injected amount of amine group compound solution]×[Density of amine group compound solution]×[wt % of amine group compound in amine group compound solution]×[wt % of amine group compound after drying]   <Formula 1>

That is, the wt % of amine group compound in anode active material layer=[0.375]×[1.069]×[0.005]×[0.362]=[0.000726 mg]

Wt % of amine group compound in anode active material layer=[Amount of amine]/[Weight of anode active material layer]×100   <Formula 2>

That is, the wt % of amine group compound in anode active material layer=[0.000726 mg]/[3 mg]×100=0.0242 wt %

Experimental Example 2

Figure 2:
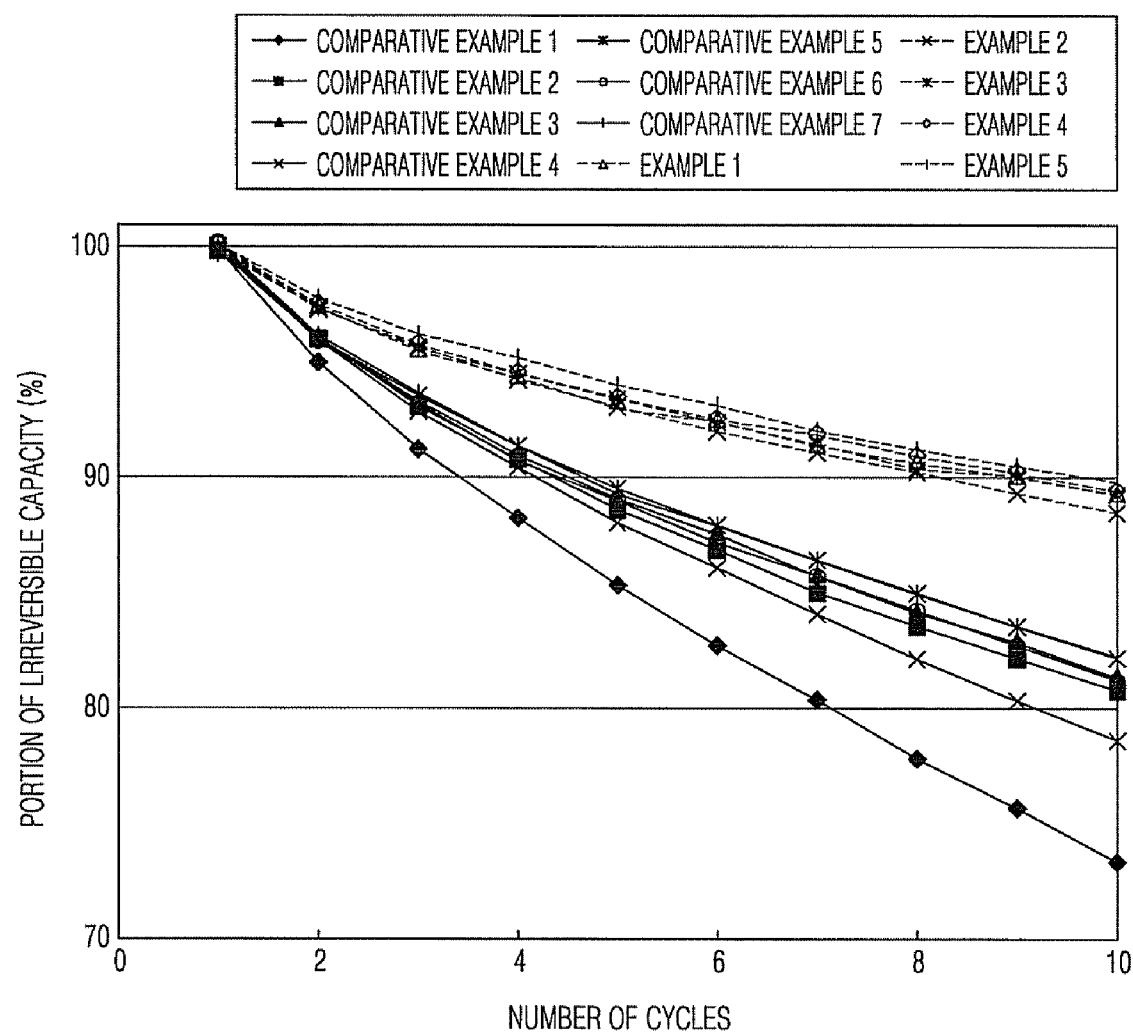
FIG. 2 illustrates cycle characteristics of lithium batteries including anodes prepared in Examples 1 through 5, and Comparative Examples 1 through 7.

The electrochemical performance of each of the coin cells was measured. To this end, a constant current charge was applied to each cell, at 100 mA per gram of active material, until the voltage reached 0.001 V, with respect to a Li electrode. After 2 hours, the completely charged cell was subjected to a constant current discharge, at 100 mA per gram of active material, until the voltage was discharged. In the same manner, charge and discharge cycles were repeated for at least 10 times, and the results thereof are shown in FIG. 2. In FIG. 2, a portion of irreversible capacity of the first cycle is 100%, and the portion of irreversible capacity thereafter can be calculated in the following manner.

Portion of irreversible capacity=Portion of irreversible capacity of previous cycle–[Portion of irreversible capacity of previous cycle×0.01×(100–Cycle efficiency of present cycle)]

In the first charge and discharge cycle, initial efficiency (%) was calculated by dividing discharge capacity, by charge capacity. In the tenth charge and discharge cycle, cycle efficiency (%) was calculated, by dividing the discharge capacity by the charge capacity. The calculation results are shown in Table 1.

| | Material | Initial efficiency | Cycle efficiency |
| --- | --- | --- | --- |
| Comparative Example 1 | Untreated | 68.6% | 97.0% |
| Comparative Example 2 | Vinyltriethoxy silane | 67.4% | 98.2% |
| Comparative Example 3 | Vinyltri(2-methoxyethoxy) silane | 68.6% | 98.2% |
| Comparative Example 4 | N-octadecyltrimethoxy silane | 68.1% | 97.5% |
| Comparative Example 5 | Glycydoxypropyltrimethoxysilane | 67.9% | 98.4% |
| Comparative Example 6 | Mercaptopropyl trimethoxysilane | 67.3% | 98.3% |
| Comparative Example 7 | Methacryloxymethyltriethoxysilane | 68.2% | 98.3% |
| Comparative Example 8 | Aminopropyltriethoxy silane | 19.1% | 98.9% |
| Example 1 | Aminopropyltriethoxy silane | 74.9% | 99.2% |
| Example 2 | Aminopropyltrimethoxy silane | 74.8% | 99.1% |
| Example 3 | Aminopropyltriethoxy silane | 75.5% | 99.2% |
| Example 4 | Aminopropyltriethoxy silane | 75.8% | 99.1% |
| Example 5 | Aminopropyltriethoxy silane | 75.4% | 99.1% |

As can be confirmed from Table 1, the initial efficiency and the cycle efficiency were improved, by forming a surface coating on an electrode using an amine group containing compound. The charge and discharge test was performed for the anodes manufactured according to Examples 1 to 8 and Comparative Examples 1 to 8. According to the comparison results, the initial efficiency and cycle efficiency of the surface treated anodes, or anodes treated with compounds containing amine groups, were improved, as compared to the anodes without a surface treatment, or the anodes treated with compounds containing functional groups other than amine. The effects of such improvement in the initial efficiency and the cycle efficiency are considered to be that the compounds containing amine groups suppress side reactions with an electrolyte solution, and improve a binding force between active material particles.

As described above, the surface treated anode, according to aspects of the present invention, includes a surface coating containing an anode active material based on a composite material having Si/C or Sn/C, as a main component. Such a composition suppresses irreversible reactions during charging and discharging, and improves charge and discharge efficiency, by increasing the binding force between active materials.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A surface treated anode comprising:
   a current collector; and
   an anode active material layer disposed on the current collector,
      wherein the anode active material layer is surface treated with an amine group containing compound.

2. The surface treated anode of claim 1, wherein the amine group containing compound is at least one selected from the group consisting of an amine group containing silane compound, a germanium compound, a tin compound, an aluminum compound, a gallium compound, an indium compound, a titanium compound, and an amine group containing hydrocarbon compound.

3. The surface treated anode of claim 1, wherein the amine group containing compound is at least one selected from the group consisting of aminosilane, diaminosilane, aminotrialkoxysilane, diaminodialkoxysilane, aminoalkyltrialkoxy silane, and diaminoalkyldialkoxysilane.

4. The surface treated anode of claim 1, wherein the amine group containing compound forms a surface coating on the anode active material layer.

5. The surface treated anode of claim 1, wherein the anode active material layer comprises the amine group containing compound in an amount ranging from about 0.0001 to 2 wt %, based on the weight of the anode active material layer.

6. The surface treated anode of claim 1, wherein the anode active material layer comprises an anode active material, a conducting agent, and a binder.

7. The surface treated anode of claim 6, wherein the anode active material comprises a metal-based anode active material, a carbonaceous anode active material, or a composite anode active material thereof.

8. The surface treated anode of claim 6, wherein the anode active material is a silicon (Si)-carbon (C) composite, or a tin (Sn)-carbon (C) composite.

9. The surface treated anode of claim 1, wherein the current collector is copper (Cu).

10. A method of preparing a surface treated anode comprising:
    preparing an anode active material mixture by mixing an anode active material, a conducting agent, a binder and a first solvent;
    applying a layer of the anode active material mixture to a current collector; and
    applying a surface treatment mixture to the surface of the anode active material layer, and drying the anode active material layer in a vacuum,
       wherein the surface treatment mixture comprises an amine group containing compound and a second solvent.

11. The method of claim 10, wherein the surface treatment mixture comprises from 0.1 to 50 wt % of the amine group containing compound.

12. The method of claim 10, wherein the drying in the vacuum is performed at a temperature ranging from 50 to 200° C., for from about 0.1 to about 20 hours.

13. A lithium battery comprising:
    a cathode;
    an anode comprising an anode active material layer that is surface treated with an amine group containing compound; and
    an electrolyte solution.

14. The battery of claim 13, wherein the amine group containing compound is at least one selected from the group consisting of an amine group containing silane compound, a germanium compound, a tin compound, an aluminum compound, a gallium compound, an indium compound, a titanium compound, and an amine group containing hydrocarbon compound.

15. The battery of claim 13, wherein the amine group containing compound is at least one selected from the group consisting of aminosilane, diaminosilane, aminotrialkoxysilane, diaminodialkoxysilane, aminoalkyltrialkoxy silane, and diaminoalkyldialkoxysilane.

16. The battery of claim 13, wherein the anode active material layer comprises the amine group containing compound in an amount ranging from about 0.0001 to 2 wt %, based on the weight of the anode active material layer.

17. The battery of claim 13, wherein the anode active material layer comprises an anode active material, a conducting agent, and a binder.

18. The battery of claim 13, wherein the anode active material layer comprises an anode active material, a conducting agent, and a binder.

19. The battery of claim 18, wherein the anode active material comprises a metal-based anode active material, a carbonaceous anode active material, or a composite anode active material thereof.

20. The battery of claim 18, wherein the anode active material is a silicon (Si)-carbon (C) composite, or a tin (Sn)-carbon (C) composite.

* * * * *